(12) United States Patent
Helsley

(10) Patent No.: US 11,358,701 B2
(45) Date of Patent: Jun. 14, 2022

(54) DOOR ASSEMBLY WITH DOUBLE-ACTING HINGE

(71) Applicant: HARTWELL CORPORATION, Placentia, CA (US)

(72) Inventor: Thomas J. Helsley, Long Beach, CA (US)

(73) Assignee: Hartwell Corporation, Placentia, CA (US)

( * ) Notice: Subject to any disclaimer, the term of this patent is extended or adjusted under 35 U.S.C. 154(b) by 382 days.

(21) Appl. No.: 16/365,745

(22) Filed: Mar. 27, 2019

(65) Prior Publication Data

US 2019/0300142 A1    Oct. 3, 2019

Related U.S. Application Data

(60) Provisional application No. 62/649,013, filed on Mar. 28, 2018.

(51) Int. Cl.
*B64C 1/14* (2006.01)
*E05F 1/12* (2006.01)
*E05D 3/12* (2006.01)

(52) U.S. Cl.
CPC .......... *B64C 1/1415* (2013.01); *B64C 1/1407* (2013.01); *B64C 1/1461* (2013.01); *E05D 3/12* (2013.01); *E05F 1/1215* (2013.01); *E05Y 2900/502* (2013.01)

(58) Field of Classification Search
CPC ... B64C 1/1415; B64C 1/1407; B64C 1/1461; E05Y 2900/502; E05F 1/1215; E05D 3/12; E05D 15/10; E05D 5/04; E05D 5/043; E05D 5/046; E05D 5/06; E05D 5/062; E05D 5/065; E05D 3/04; E05D 3/06; Y01T 16/546; Y01T 16/5474; Y01T 16/5475; Y01T 16/558; Y01T 16/559; Y01T 16/5595; Y01T 16/55963; Y01T 16/55975
See application file for complete search history.

(56) References Cited

U.S. PATENT DOCUMENTS

| | | | | |
|---|---|---|---|---|
| 571,133 | A | * | 8/1896 | Hoffman .......................... 16/303 |
| 2,570,479 | A | | 10/1951 | Pollman |
| 2,621,359 | A | | 12/1952 | Schuyler |
| 2,730,394 | A | * | 1/1956 | Price ..................... B64C 1/1407 |
| | | | | 292/256 |
| 3,085,297 | A | | 8/1963 | Linderfelt |

(Continued)

FOREIGN PATENT DOCUMENTS

| | | |
|---|---|---|
| EP | 0402235 | 12/1990 |
| WO | WO 2011/063441 | 6/2011 |

OTHER PUBLICATIONS

Hinge Selection Guide, DAH Series, Hartwell Corp. (Available prior to filing of the present application).

(Continued)

*Primary Examiner* — Medhat Badawi
*Assistant Examiner* — Vicente Rodriguez
(74) *Attorney, Agent, or Firm* — Barnes & Thornburg LLP

(57) ABSTRACT

A hinge is coupled to a first component and a second component. The hinge supports the second component for movement relative to the first component between a closed position covering an opening through the first component and an opened position displaced from the opening.

20 Claims, 7 Drawing Sheets

(56) References Cited

U.S. PATENT DOCUMENTS

| | | | | |
|---|---|---|---|---|
| 3,183,548 A * | 5/1965 | Speakman | ............... | E05D 3/12 |
| | | | | 16/366 |
| 3,571,977 A * | 3/1971 | Abeel | ............... | E05B 51/023 |
| | | | | 49/379 |
| 3,718,171 A * | 2/1973 | Godwin | ............... | B64C 1/1415 |
| | | | | 160/210 |
| 3,791,073 A | 2/1974 | Baker | | |
| 4,199,120 A | 4/1980 | Bergman et al. | | |
| 4,383,347 A | 5/1983 | La Conte | | |
| 4,383,392 A | 5/1983 | La Conte | | |
| 4,549,671 A * | 10/1985 | Fay, III | ............... | B60J 5/0491 |
| | | | | 16/366 |
| 4,854,010 A | 8/1989 | Maraghe et al. | | |
| 5,068,946 A | 3/1991 | Marescot et al. | | |
| 5,335,880 A * | 8/1994 | Klug | ............... | B64C 1/1415 |
| | | | | 105/280 |
| 5,493,760 A * | 2/1996 | Takimoto | ............... | E05D 3/12 |
| | | | | 16/366 |
| 6,116,542 A | 9/2000 | Erben | | |
| 6,382,705 B1 | 5/2002 | Lang et al. | | |
| 6,454,210 B1 | 9/2002 | Plattner | | |
| 6,457,677 B2 * | 10/2002 | Dazet | ............... | B64D 25/14 |
| | | | | 244/137.1 |
| 6,618,904 B1 | 9/2003 | Nagy | | |
| 6,834,834 B2 | 12/2004 | Dazet et al. | | |
| 7,137,174 B2 | 11/2006 | Derbis et al. | | |
| 7,802,345 B2 | 9/2010 | Mathew et al. | | |
| 2011/0025006 A1 * | 2/2011 | Knoppers | ............... | A47B 31/00 |
| | | | | 280/47.34 |
| 2012/0325123 A1 | 12/2012 | Schoerkhuber et al. | | |
| 2015/0259960 A1 | 9/2015 | Smith | | |
| 2015/0344122 A1 | 12/2015 | Carsten et al. | | |
| 2015/0353182 A1 * | 12/2015 | Urban | ............... | E05F 15/60 |
| | | | | 244/129.5 |
| 2017/0234046 A1 | 8/2017 | Shepherd | | |
| 2018/0195328 A1 | 7/2018 | Gorenbacher | | |

OTHER PUBLICATIONS

Search Report and Written Opinion issued in Int'l App. No. PCT/US2019/024192 (dated 2019).

Hinge Selection Guide, DAH Series, Hartwell Corp. (Available prior to Mar. 27, 2019).

* cited by examiner

DOOR ASSEMBLY WITH DOUBLE-ACTING HINGE

CROSS REFERENCE TO RELATED APPLICATIONS

This application claims priority under 35 U.S.C. § 119(e) to U.S. Provisional Application Ser. No. 62/649,013, filed Mar. 28, 2018, the disclosure of which is expressly incorporated by reference herein in its entirety.

BACKGROUND

A variety of hinge structures have been developed for the aerospace industry to allow doors or access panels to be selectively closed and opened relative to the aircraft structure. As shown in FIGS. 1 and 2 (prior art), an airframe 100 includes outer panels 102 that cover a cargo hold of airframe 100, and a cargo door 104 is operated by controls 106 to allow operators to access the cargo hold. A cargo control door 108 fits in an opening 101 of panel 102 to close off a compartment 103 where controls 106 are stored during flight. A plate hinge 105 attaches cargo control door 108 to an inside wall 109 of compartment 103 for movement between a closed position (shown in FIG. 1) and an opened position (shown in FIG. 2). Button latches 107 hold cargo control door 108 in the closed position at the selection of the operator.

However, as shown in FIG. 2, plate hinge 105 only allows for a limited range of motion of cargo control door 108, generally up to about 90 degrees relative to panel 102. In the opened position, cargo control door 108 extends outward away from panel 102. The cargo control door 108 is elevated from a ground level, and an operator uses a lift to operate controls 106 and access the cargo hold of airframe 100 through cargo door 104. The lift can inadvertently contact cargo control door 108 during operation of the lift, because cargo control door 108 extends outward in the opened position, causing damage to cargo control door 108. This results in lost revenues while airframe 100 is unable to fly during repair of cargo control door 108.

This background information is merely provided for context, and no admission is intended, nor should such admission be inferred or construed, that any of the preceding information constitutes prior art to the present disclosure unless expressly recited to the contrary, nor is any waiver or disclaimer intended.

SUMMARY

According to the present disclosure, a hinge is coupled to a first component and a second component. The hinge supports the first component for movement relative to the second component between a closed position covering an opening through the second component and an opened position displaced from the opening. A latch coupled to the first component engages with the second component to hold the first component in the closed position at the selection of an operator.

In illustrative embodiments, the first component is a door assembly having a plurality of door sections and the hinge is a double-acting hinge having a corresponding plurality of links. Each link of the double-acting hinge is coupled to a respective one of the door sections. The links are coupled to one another for pivoting movement of the door sections relative to one another as the door assembly moves from the closed position to the opened position.

In illustrative embodiments, the door assembly includes three door sections and the hinge includes three links. A first link is coupled to the second component and a first door section is coupled to the first link. A second link is coupled to the first link for rotation relative to the first link and a second door section is coupled to the second link for movement with the second link. A third link is coupled to the second link for rotation relative to the second link and a third door section is coupled to the third link for movement with the third link.

In illustrative embodiments, each door section covers a respective portion of the opening when the door assembly is in the closed position. The second and third door sections move relative to the first door section from the closed position to the opened position. The latch is coupled to the third door section.

In illustrative embodiments, the door sections and links have sealing features for engaging with one another and around the opening to form at least a partial seal for blocking debris and fluids from passing through the opening.

BRIEF DESCRIPTION OF THE DRAWINGS

The present disclosure will be described hereafter with reference to the attached drawings which are given as a non-limiting example only, in which.

Figures 1, 2:
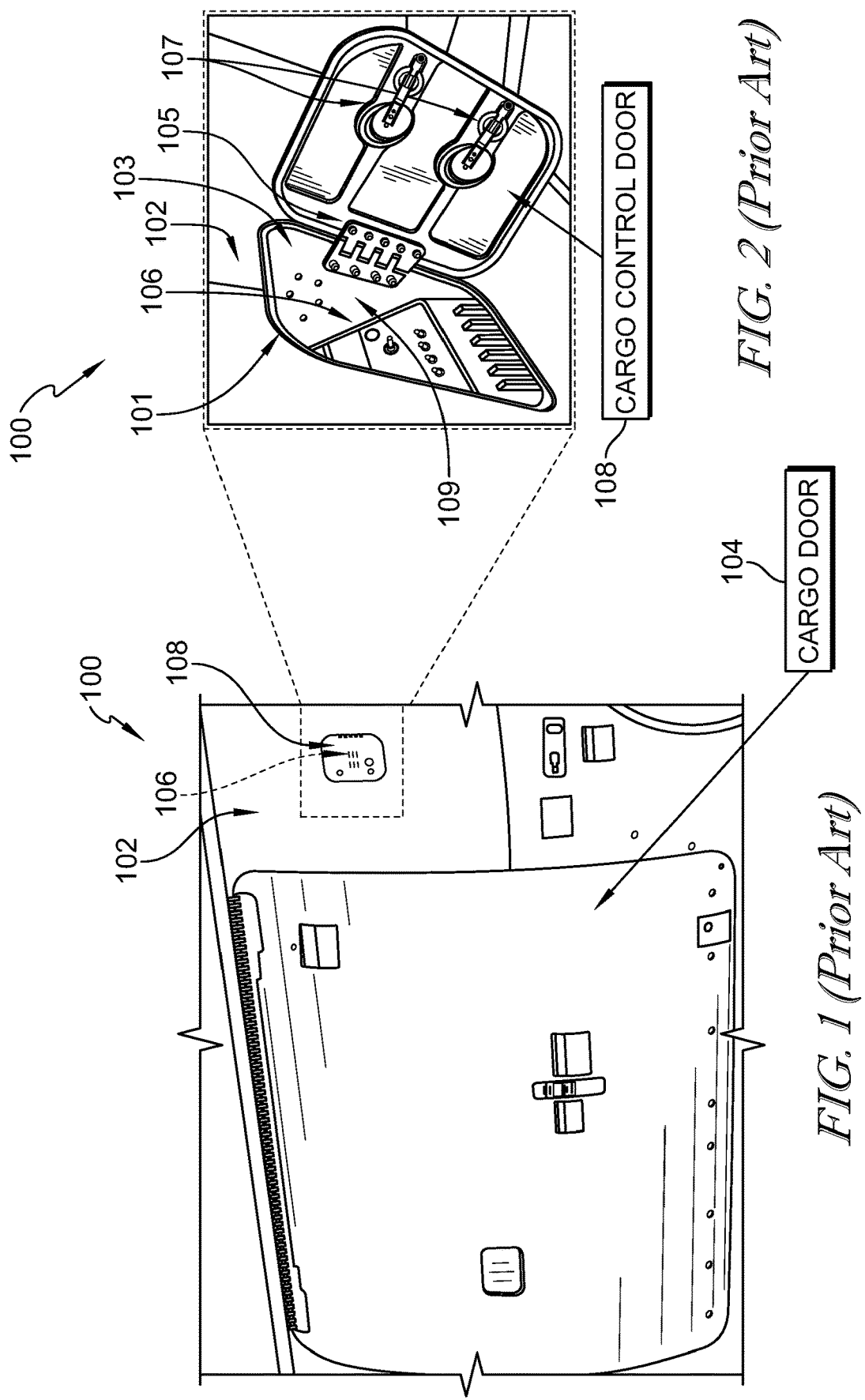
FIG. 1 is a front elevation view of a prior art airframe having a cargo door for accessing a cargo hold of the airframe and a cargo control door for covering a compartment housing controls for the cargo door.
FIG. 2 is an enlarged view of FIG. 1 showing the cargo control door in an opened position extending generally perpendicular outward from a panel of the airframe.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Figure 3:
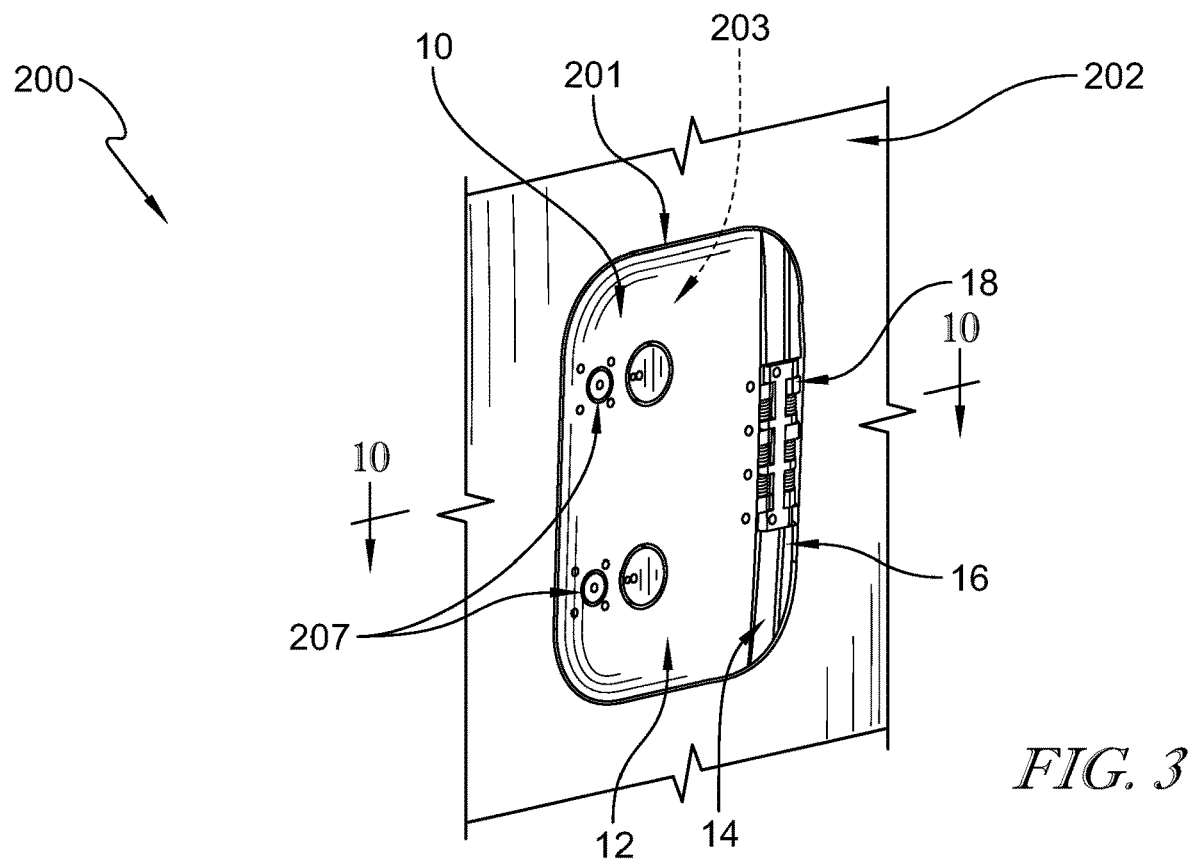
FIG. 3 is a perspective view of a portion of an airframe showing a door assembly according to the present disclosure positioned in an opening of the airframe in a closed position to close a compartment of the airframe and suggesting that latches hold the door assembly in the closed position at the selection of an operator.

A portion of an airframe 200 having a door assembly 10 in accordance with the present disclosure is shown in FIG. 3. Door assembly 10 selectively covers an opening 201 formed through an outer panel 202 of airframe 200. Door assembly 10 is shown in a closed position in FIG. 3 covering opening 201 and closing a compartment 203 of airframe 200. Latches 207 (such as button latches) engage with opening 201 to hold door assembly 10 in the closed position at the selection of an operator.

Figure 4:
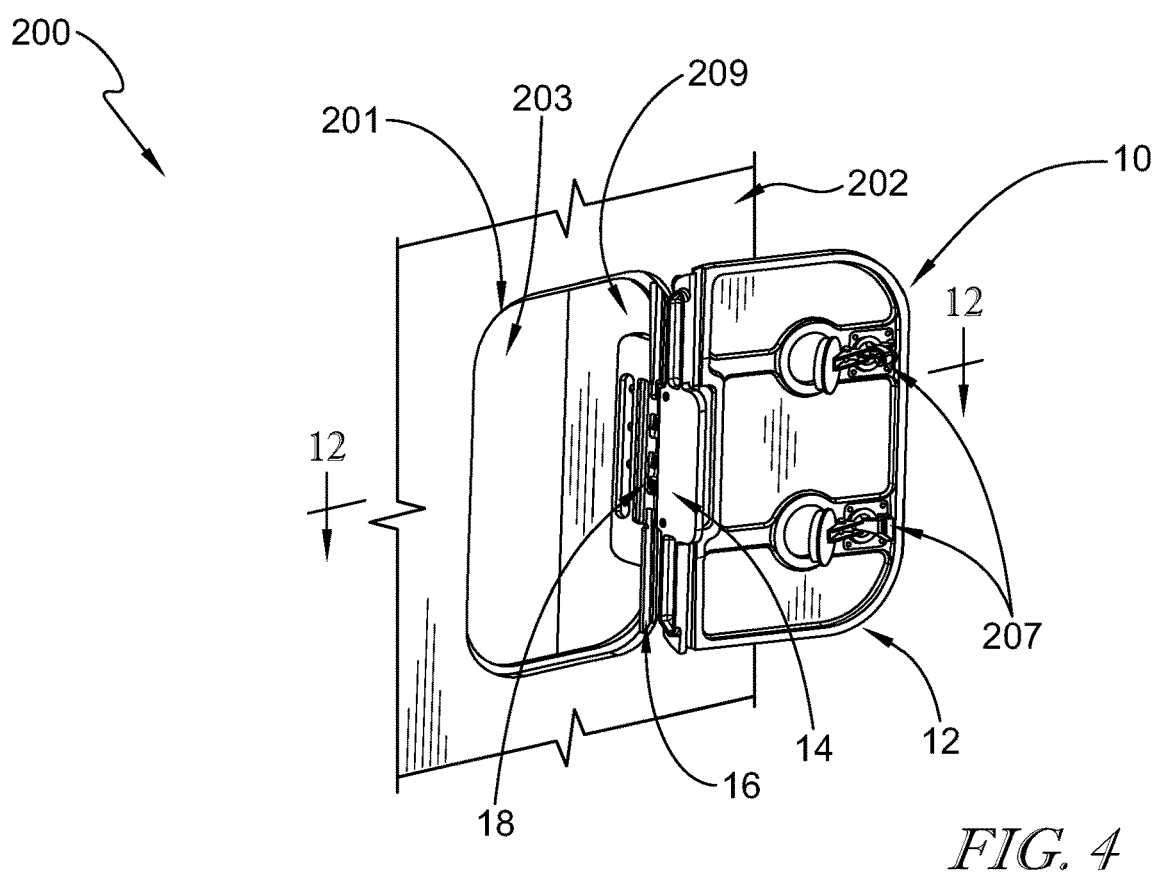
FIG. 4 is a view similar to FIG. 3 showing the door assembly in an opened position removed from the opening and extending along an outer panel of the airframe and suggesting that sections of the door assembly pivot relative to one another on a double-acting hinge as the door assembly moves from the closed position to the opened position.
Figure 5:
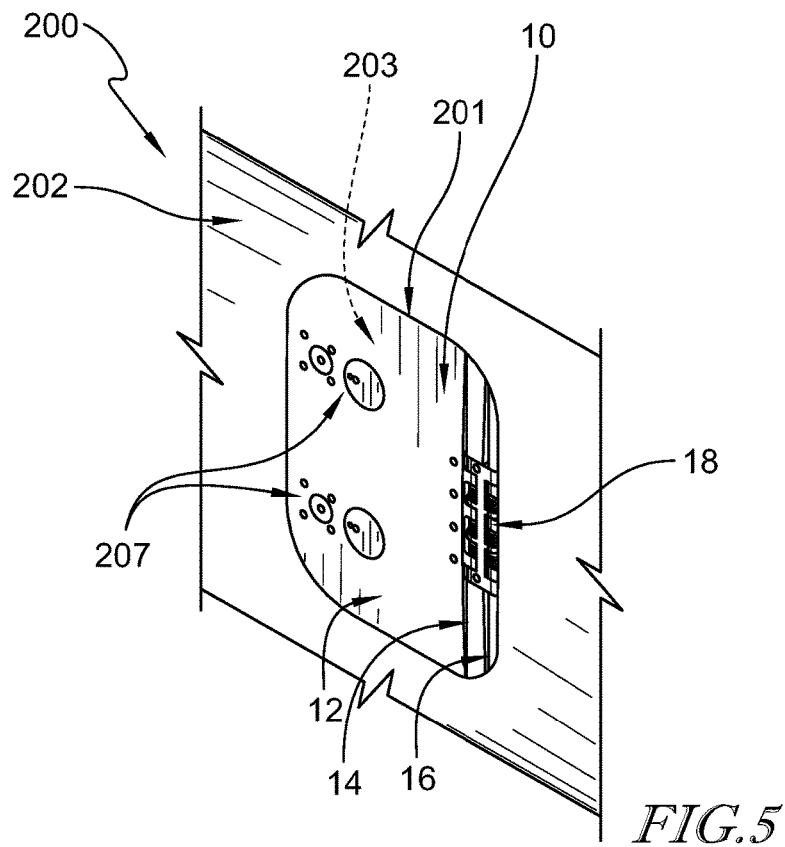
FIG. 5 is a view similar to FIG. 3.
Figure 6:
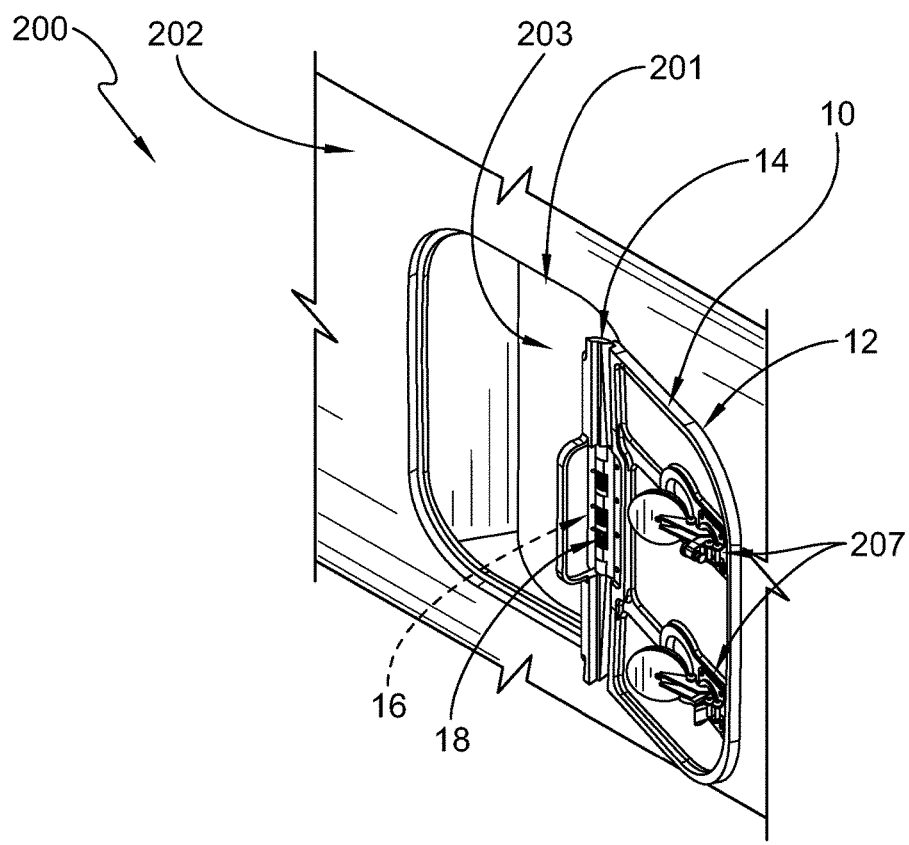
FIG. 6 is a view similar to FIG. 4.

Door assembly 10 includes door sections 12, 14, 16 coupled together by a double-acting hinge 18 as shown in FIGS. 3-6. Double-acting hinge 18 and door section 16 are coupled to an interior wall 209 of compartment 203. Door sections 12, 14, 16 pivot relative to one another on double-acting hinge 18 as door assembly moves from the closed position (shown in FIGS. 3 and 5) to an opened position (shown in FIGS. 4 and 6). Each door section 12, 14, 16 covers a respective portion of opening 201 when door assembly 10 is in the closed position. In the illustrative embodiment, door section 16 extends partially into opening 201 (though minimally to maintain clearance through opening 201 to access compartment 203), door section 14 extends outward from panel 202, and door section 12 extends along panel 202 when door assembly 10 is in the opened position as shown in FIG. 4 to provide clearance for other moving components alongside airframe 200, such as lifts, operators, and other doors of airframe 200.

Figure 7:
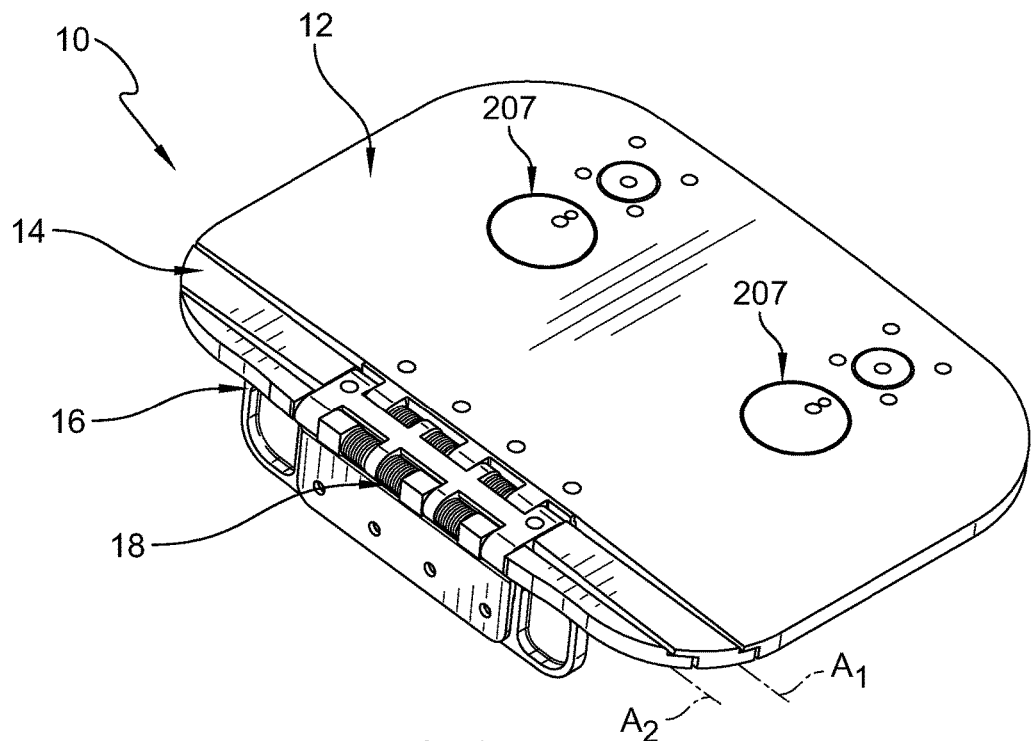
FIG. 7 is a perspective view of the door assembly of FIG. 3.
Figure 8:
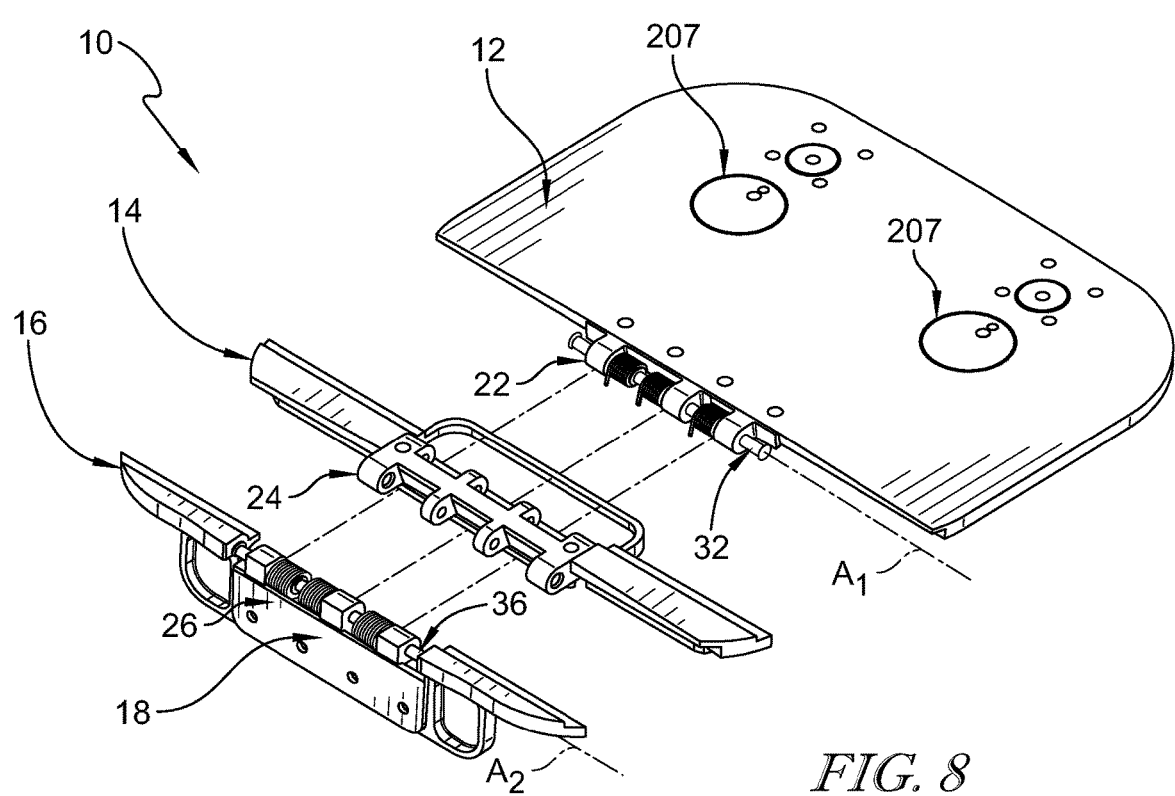
FIG. 8 is a partial exploded assembly view of the door assembly of FIG. 7.

Double-acting hinge 18 allows door section 12 to pivot about an axis $A_1$ relative to door section 14, and allows door section 14 to pivot about an axis $A_2$ relative to door section 16, as suggested in FIG. 7. Double-acting hinge 18 includes three links 22, 24, 26 as shown in FIG. 8, though additional links could be used. A first link 22 of double-acting hinge 18 is coupled to door section 12 with fasteners (such as rivets). A second link 24 is coupled to door section 14 with fasteners (such as rivets). A third link 26 is coupled to door section 16 with fasteners (such as rivets). In the illustrative embodiment, link 26 and door section 16 are coupled to interior wall 209 and are fixed in position relative to opening 201 as suggested in FIG. 4.

Figure 9:
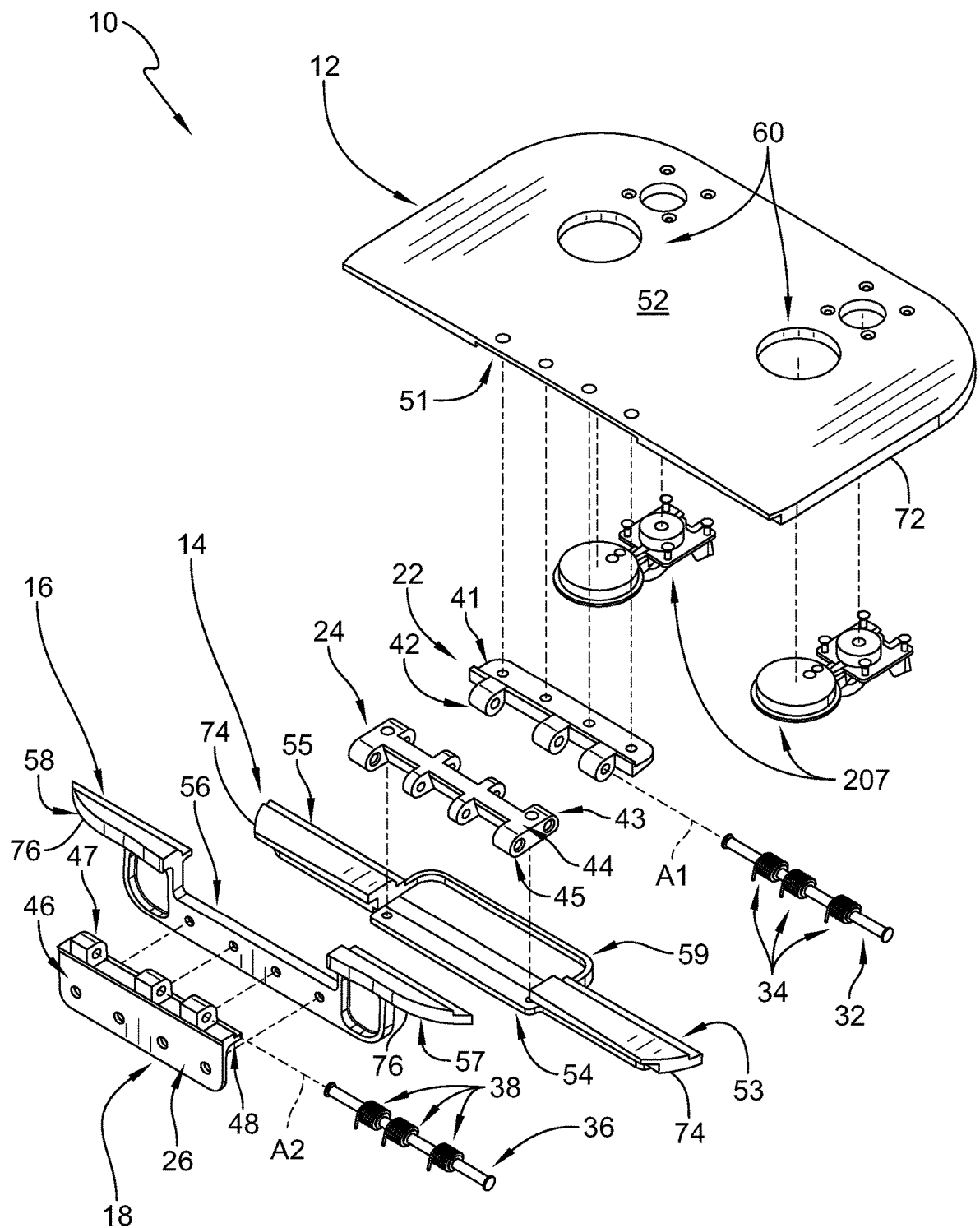
FIG. 9 is an exploded assembly view of the door assembly of FIG. 8.

Links 22, 24, 26 of double-acting hinge 18 are coupled together by pins 32, 36 as suggested in FIG. 9. One or more springs 34, 38 engage with links 22, 24, 26 to bias door assembly 10 toward the opened position. As used herein, springs 34, 38 are not limited to what is shown but is intended to broadly include by way of illustration, and not limitation, to coil springs, torsion springs, compression springs, and any other type of mechanism that achieves the function of biasing door open assembly 10 toward the opened position. Link 22 includes a plate 41 and knuckles 42 coupled to plate 41. Link 24 includes a bar 44 and knuckles 43, 45 coupled on opposing sides of bar 44. Link 26 includes a plate 46 and knuckles 47 coupled to plate 46. A lip 48 extends from plate 46 toward link 24. Pin 32 extends through knuckles 42, 43 to couple together links 22, 24 for pivoting movement about axis $A_1$. Pin 36 extends through knuckles 45, 47 to couple together links 24, 26 for pivoting movement about axis $A_2$.

Door section 12 of door assembly 10 includes a body 52 and a recess 51 sized to receive plate 41 of link 22 as suggested in FIG. 9. In the illustrative embodiment, holes 60 are formed through body 52 for coupling latches 207 to door section 12. Door section 14 includes a base 54 and wings 53, 55 extending from opposing ends of base 54. Base 54 is sized to receive at least a portion of link 24 therein and is coupled to bar 44 with fasteners (such as rivets). A lip 59 extends upward from base 54. Door section 16 includes a base 56 and wings 57, 58 extending from opposing ends of base 56. Wings 57, 58 are spaced apart from one another, and at least a portion of link 26 is positioned between wings 57, 58. Plate 46 of link 26 couples to base 56 with fasteners (such as rivets).

Figure 10:
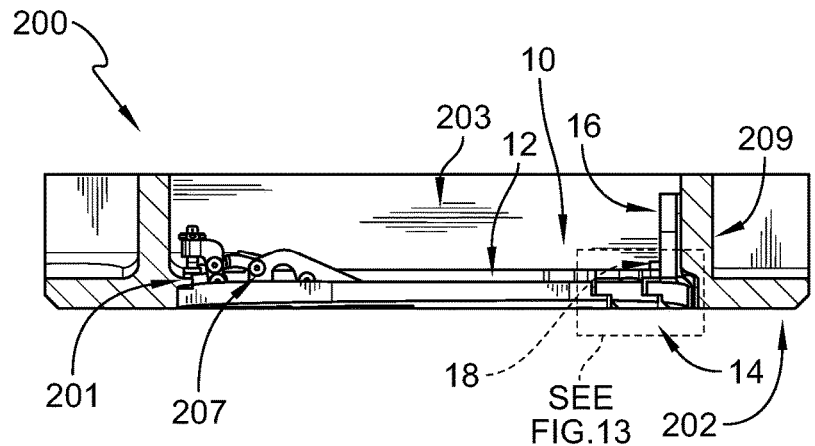
FIGS. 10-12 are a series of views illustrating movement of the door assembly from the closed position to the opened position.
Figure 11:
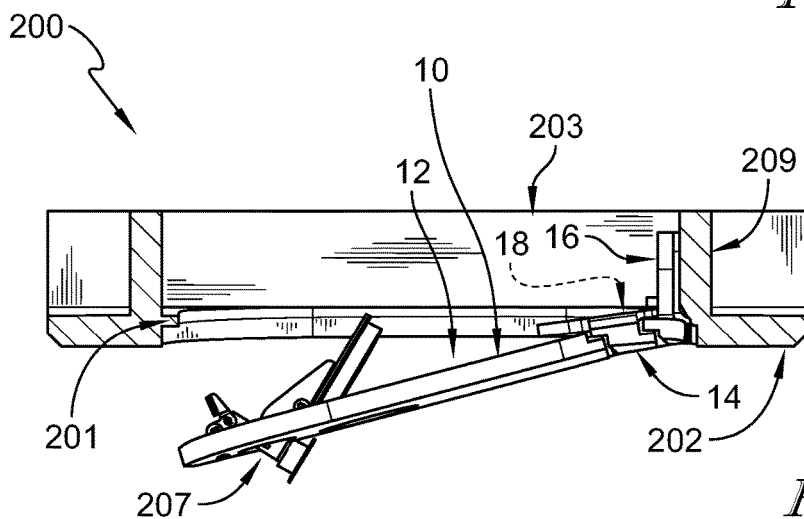
Figure 12:
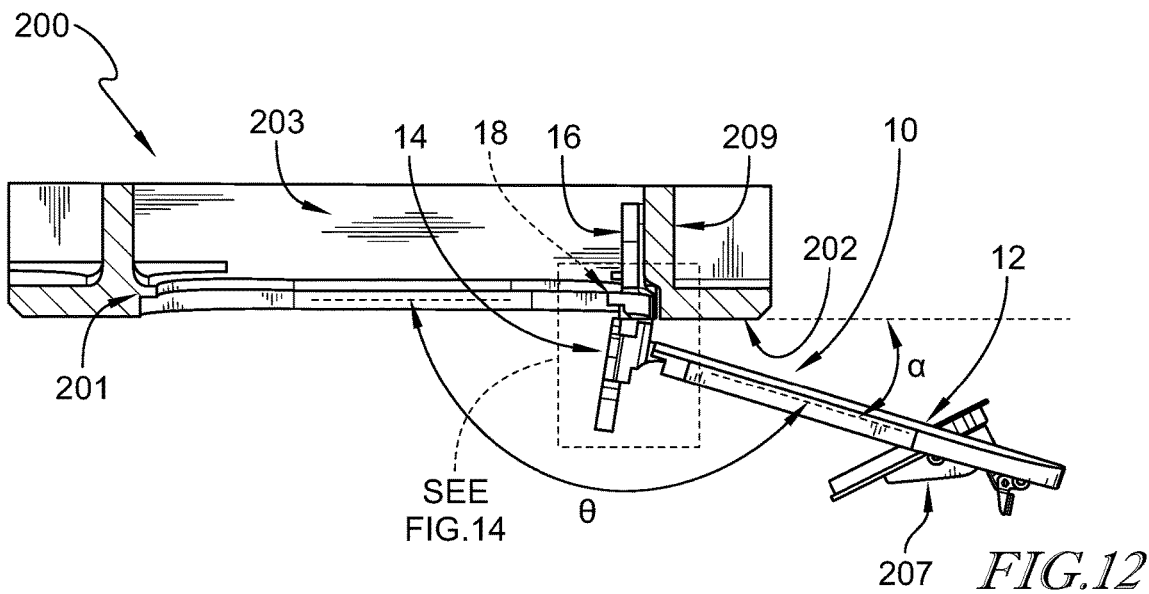

Door sections 12, 14, 16 are generally aligned with one another when door assembly 10 is in the closed position as suggested in FIG. 10. To open door assembly 10, an operator releases latches 207 and allows double-acting hinge 18 (with springs 34, 38) to move door sections 12, 14 relative to opening 201 toward the opened position as suggested in FIGS. 11 and 12. In the illustrative embodiment, door section 12 moves through an angle θ of about 150 degrees to about 175 degrees from the closed position to the opened position as suggested in FIG. 12. Door section 12 is positioned at an angle α of about 30 degrees to about 5 degrees relative to panel 202 to allow for clearance of latches 207 and avoid contact of latches 207 with panel 202. In some embodiments, angles θ, α can be larger or smaller depending on the structure surrounding opening 201. In some embodiments, latches 207 do not protrude outward from door section 12 such that when door section 12 is rotated to an angle θ of about 180 degrees from the closed position to the opened position and latches 207 will not contact panel 202. In some embodiments, door section 14 and link 24 are sized to space door section 12 apart from panel 202 to allow door section 12 to move through an angle θ of about 180 degrees or more from the closed position to the opened position without contacting panel 202. In some embodiments, angle θ and/or angle α are selected with the objective of minimizing a profile of door assembly 10 relative to airframe 200 (e.g., such that door section 12 extends along panel 202 rather than perpendicular to panel 202) to keep door assembly 10 clear of moving objects around airframe 200.

Figure 13:
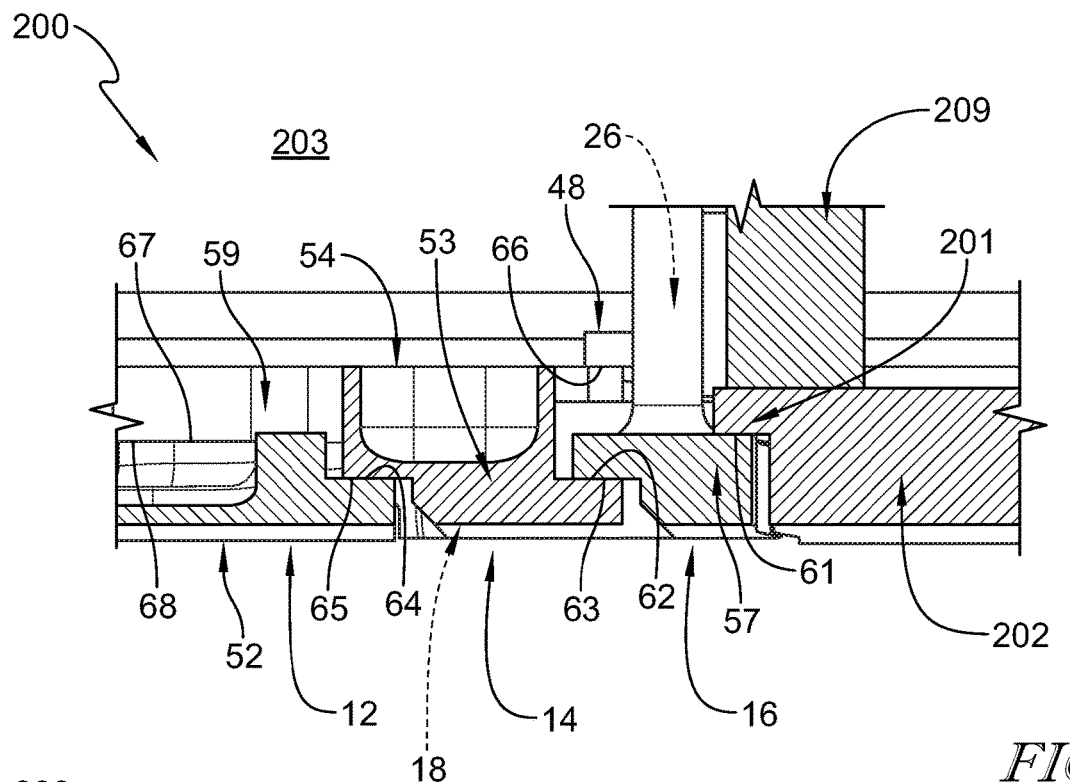
FIG. 13 is an enlarged view of FIG. 10.
Figure 14:
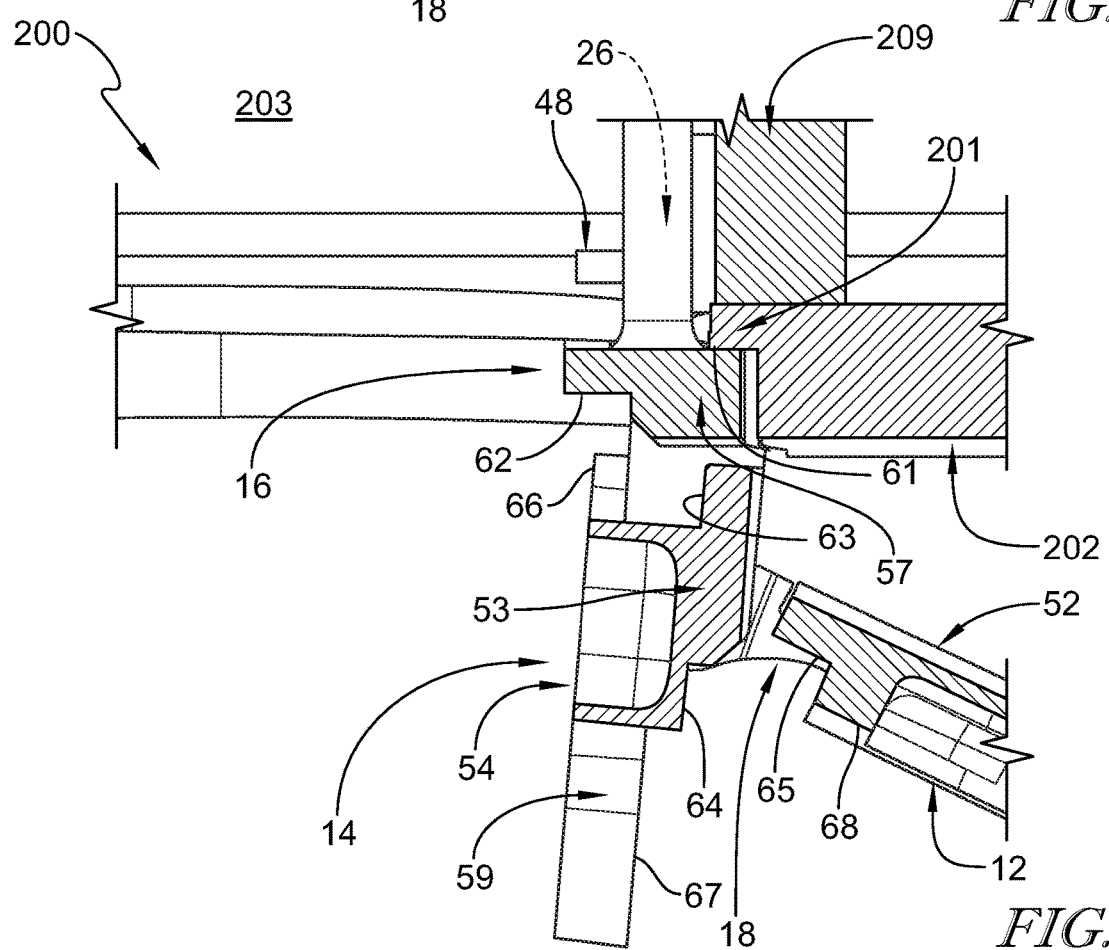
FIG. 14 is an enlarged view of FIG. 12.

Door assembly 10 provides sealing features for blocking debris and fluids, such as rain and deicer liquid, from passing into compartment 203 through opening 201 when door assembly 10 is in the closed position as suggested in FIGS. 9, 13, and 14. Ledges 61 of wings 57, 58 on door section 16 (only wing 57 shown in FIG. 13) engages with opening 201 to form at least a partial seal therewith as shown in FIG. 13. Ledges 62 of wings 57, 58 of door section 16 engage with ledges 63 of wings 53, 55, respectively, of door section 14 (only wings 53, 57 shown in FIG. 13) to form at least a partial seal therebetween. Ledges 64 of wings 53, 55 of door section 14 engage with ledges 65 of door section 12 to form at least a partial seal therebetween. Perimeter edges 72, 74, 76 on door section 12, 14, 16, respectively, engage with opening 201 to form at least a partial seal therewith as suggested in FIGS. 9 and 10. In some embodiments, gaskets are positioned between mating components.

Additional seals are also formed by connection and engagement of links 22, 24, 26 with door sections 12, 14, 16 as suggested in FIGS. 9 and 13. Further, lip 48 of link 26 engages with a ledge 66 of base 54 of door section 14 to form at least a partial seal therebetween. A ledge 67 of lip 59 on door section 14 engages with a ledge 68 of door section 12 to form at least a partial seal therebetween. In some embodiments, gaskets are positioned between mating components. The sealing features of door assembly 10 are substantially disengaged when door assembly 10 is in the opened position as suggested in FIG. 14.

While three door sections 12, 14, 16 with three corresponding links 22, 24, 26 are shown, more or less door sections and more or less links can be used without departing from the present disclosure. For example, in some embodiments, door section 16 can be formed as part of airframe 200 adjacent to interior wall 209 and at least partially define opening 201. A door assembly can include only two door sections 12, 14 and three links 22, 24, 26, with link 26 coupled to interior wall 209 and door sections 12, 14 moving with links 22, 24 relative to opening 201. In some embodiments, door section 16 and link 26 can be formed as part of airframe 200 adjacent to interior wall 209 and at least partially define opening 201. A door assembly can include only two door sections 12, 14 and two links 22, 24 where door sections 12, 14 move with links 22, 24 relative to opening 201. In some embodiments, more than three door sections and three links can be used.

While a common number of door sections 12, 14, 16 and links 22, 24, 26 are shown, dissimilar numbers of links and door sections can be used. For example, in some embodiments, link 22 can be formed as part of door section 12 such that two links 24, 26 can be used with three door sections 12, 14, 16. In some embodiments, link 24 can be formed as part of door section 14. In some embodiments, link 26 can be formed as part of door section 16. In some embodiments, three or more links are coupled between adjacent door sections (e.g., three links for two door sections).

The respective sizes and shapes of the door sections 12, 14, 16 and links 22, 24, 26 are also not limited to what is shown but are intended to broadly include by way of illustration and not limitation a variety of relative sizes without departing from the present disclosure. For example, in some embodiments, door sections 12, 14 cover substantially similar areas of opening 201 when in the closed position, and links 22, 24, 26 are sized and/or arranged for relative rotation to allow door sections 12, 14 to extend closely along panel 202 with minimal outward extension. In some embodiments, door assembly 10 is arranged as a retrofit component adhering to the same constraints as the original door (e.g., opening size, hinge location, etc.) but allowing a wider range of motion as disclosed herein.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure.

What is claimed is:

1. A door assembly comprising:
    a double-acting hinge having a first link, a second link coupled to the first link by a first pin for pivoting movement relative to the first link, and a third link coupled to the second link by a second pin for pivoting movement relative to the second link;
    a first door section coupled to the first link;
    a second door section coupled to the second link; and
    a third door section coupled to the third link,
    wherein the first, second, and third door sections are aligned with one another when the door assembly is in a closed position, and the second door section is rotatable relative to the first door section and the third door section is rotatable relative to the second door section to move the door assembly to an opened position displaced from the closed position.

2. The door assembly of claim 1, wherein the third door section rotates at least about 150 degrees between the closed and opened positions.

3. The door assembly of claim 2, wherein the third door section rotates through a range of about 150 degrees and about 180 degrees between the closed and opened positions.

4. The door assembly of claim 1, wherein the first door section includes a first pair of wings and the second door section includes a second pair of wings, and wherein the first link is positioned between the first pair of wings and the second link is positioned between the second pair of wings.

5. The door assembly of claim 4, wherein the first pair of wings engage with the second pair of wings in the closed position to form a seal therebetween.

6. The door assembly of claim 5, wherein the second pair of wings engage with the third door section in the closed position to form a seal therebetween.

7. The door assembly of claim 6, wherein the second door section further includes a base positioned between the second pair of wings and a lip extending from the base, wherein the base engages with the first link in the closed position to form a seal therebetween, and wherein the lip engages with the third door section in the closed position to form a seal therebetween.

8. The door assembly of claim 1, further comprising one or more springs engaged with the first, second, and third links, wherein the one or more springs bias the first, second, and third door sections toward the opened position.

9. A door assembly for use in covering an opening of an airframe, the door assembly comprising:
    a double-acting hinge having a first link coupled to the airframe, a second link coupled to the first link by a first pin for pivoting movement relative to the first link, and a third link coupled to the second link by a second pin for pivoting movement relative to the second link;
    a first door section coupled to the first link;
    a second door section coupled to the second link; and
    a third door section coupled to the third link, wherein the first, second, and third door sections are aligned with one another to cover the opening when the door assembly is in a closed position, and the second door section is rotatable relative to the first door section and the third door section is rotatable relative to the second door section to move the door assembly to an opened position displaced from the opening.

10. The door assembly of claim 9, wherein the third door section rotates at least about 150 degrees between the closed and opened positions.

11. The door assembly of claim 10, wherein the third door section rotates through a range of about 150 degrees and about 180 degrees between the closed and opened positions.

12. The door assembly of claim 9, wherein the first door section includes a first pair of wings and the second door section includes a second pair of wings, and wherein the first link is positioned between the first pair of wings and the second link is positioned between the second pair of wings.

13. The door assembly of claim 12, wherein the first pair of wings engage with the second pair of wings in the closed position to form a seal therebetween.

14. The door assembly of claim 13, wherein the second pair of wings engage with the third door section in the closed position to form a seal therebetween.

15. The door assembly of claim 14, wherein the first, second, and third door sections engage with the opening in the closed position to form a seal around the opening.

16. The door assembly of claim 14, wherein the second door section further includes a base positioned between the second pair of wings and a lip extending from the base, wherein the base engages with the first link in the closed position to form a seal therebetween, and wherein the lip engages with the third door section in the closed position to form a seal therebetween.

17. The door assembly of claim 9, further comprising one or more springs engaged with the first, second, and third links, wherein the one or more springs bias the first, second, and third door sections toward the opened position.

18. The door assembly of claim 17, further comprising one or more latches coupled to the third door section and configured to engage with the airframe to hold the door assembly in the closed position at the selection of an operator.

19. A door assembly for use in covering an opening of an airframe, the door assembly comprising:
a double-acting hinge having a first link coupled to the airframe, a second link coupled to the first link by a first pin for pivoting movement relative to the first link about a first axis, and a third link coupled to the second link by a second pin for pivoting movement relative to the second link about a second axis, the first axis spaced apart from the second axis;
a first door section coupled to the first link, the first door section including a first pair of wings, the first link coupled between the first pair of wings;
a second door section coupled to the second link, the second door section including a second pair of wings, the second link coupled between the second pair of wings; and
a third door section coupled to the third link,
wherein the first, second, and third door sections are aligned with one another to cover the opening when the door assembly is in a closed position, the second door section is rotatable relative to the first door section and the third door section is rotatable relative to the second door section to move the door assembly to an opened position displaced from the opening, the first pair of wings engage with the second pair of wings in the closed position to form a seal therebetween, the second pair of wings engage with the third door section in the closed position to form a seal therebetween, and the first pair of wings, the second pair of wings, and the third door section engage with the opening in the closed position to form a seal around the opening.

20. The door assembly of claim 19, wherein the third door section rotates through a range of about 150 degrees and about 180 degrees between the closed and opened positions, wherein the second door section further includes a base positioned between the second pair of wings and a lip extending from the base, wherein the base engages with the first link in the closed position to form a seal therebetween, and wherein the lip engages with the third door section in the closed position to form a seal therebetween.

* * * * *